United States Patent
Valdez et al.

(10) Patent No.: US 8,183,174 B2
(45) Date of Patent: May 22, 2012

(54) IR-DOPED RUTHENIUM OXIDE CATALYST FOR OXYGEN EVOLUTION

(75) Inventors: Thomas I. Valdez, Covina, CA (US); Sekharipuram R. Narayanan, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 295 days.

(21) Appl. No.: 12/580,107

(22) Filed: Oct. 15, 2009

(65) Prior Publication Data

US 2010/0089745 A1    Apr. 15, 2010

Related U.S. Application Data

(60) Provisional application No. 61/196,183, filed on Oct. 15, 2008, provisional application No. 61/222,413, filed on Jul. 1, 2009.

(51) Int. Cl.
| | |
|---|---|
| *B01J 23/62* | (2006.01) |
| *B01J 23/40* | (2006.01) |
| *B01J 23/00* | (2006.01) |
| *B01J 23/46* | (2006.01) |
| *B01J 23/54* | (2006.01) |
| *B01J 23/56* | (2006.01) |
| *B01J 37/04* | (2006.01) |
| *H01M 4/88* | (2006.01) |

(52) U.S. Cl. ........ 502/325; 502/326; 502/101; 204/291; 204/292; 419/10; 419/19; 419/66; 429/523; 429/526; 429/528; 429/529; 252/513; 252/514; 252/518.1; 252/519.13; 423/594.1

(58) Field of Classification Search ................... 502/325, 502/326, 101; 204/283, 284, 291, 292; 429/523, 429/526, 528, 529; 252/513, 514, 518.1, 252/519.13; 419/10, 19, 66; 423/594.1
See application file for complete search history.

(56) References Cited

U.S. PATENT DOCUMENTS

| | | | |
|---|---|---|---|
| 4,276,146 A | 6/1981 | Coker et al. | |
| 4,289,591 A | 9/1981 | Davidson et al. | |
| 4,395,316 A | 7/1983 | St. John | |
| 2010/0113260 A1* | 5/2010 | Hagemeyer | ............ 502/185 |

OTHER PUBLICATIONS

International Search Report and Written Opinion, for related PCT application PCT/US2009/060883.

* cited by examiner

*Primary Examiner* — Bruce Bell
(74) *Attorney, Agent, or Firm* — Berliner & Associates

(57) ABSTRACT

A method for preparing a metal-doped ruthenium oxide material by heating a mixture of a doping metal and a source of ruthenium under an inert atmosphere. In some embodiments, the doping metal is in the form of iridium black or lead powder, and the source of ruthenium is a powdered ruthenium oxide. An iridium-doped or lead-doped ruthenium oxide material can perform as an oxygen evolution catalyst and can be fabricated into electrodes for electrolysis cells.

20 Claims, 3 Drawing Sheets

IR-DOPED RUTHENIUM OXIDE CATALYST FOR OXYGEN EVOLUTION

CROSS-REFERENCE TO RELATED APPLICATIONS

This application claims the benefit of Provisional Patent Application No. 61/196,183, filed on Oct. 15, 2008, and No. 61/222,413, filed on Jul. 1, 2009, both of which are incorporated by reference herein.

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

BACKGROUND

1. Field of the Invention

The invention relates to a metal-doped ruthenium oxide material and methods of preparing the same.

2. Related Art

Water electrolyzers based on proton exchange membrane (PEM) technology offer several advantages for hydrogen production (1-3). In a PEM-based electrolyzer, water is oxidized into oxygen and protons at the anode. The protons resulting from the electro-oxidation of water are transported through the PEM and combined at the cathode to form hydrogen. When developing advanced PEM electrolyzers, a catalyst that can enhance the production of oxygen gas at the anode would increase the electrolysis efficiency. A desirable oxygen evolution catalyst would have a low overpotential for oxygen evolution, high surface area, and long-term mechanical stability (4). It has previously been reported that a catalyst based on a non-stoichiometric ruthenium oxide enhances the electrolysis of water (5). Also iridium ruthenium oxide catalysts are known to be active towards oxygen evolution (6-8).

Although it is known that ruthenium oxide can be an efficient catalyst for the anodic oxidation of water to oxygen, one issue with ruthenium oxide is that it is not stable in acidic media at oxygen evolution potentials and as such degrades rapidly with use resulting in loss of performance of the PEM electrolysis unit. A stabilized and/or active ruthenium oxide catalyst is thus highly desirable. Catalysts for water electrolysis based on iridium and ruthenium oxide are commercially available, but information for preparing these proprietary materials has not been provided.

SUMMARY

In one aspect, a method of making a metal-doped material is provided. The method includes preparing a mixture comprising a doping metal and a source of ruthenium, and heating the mixture in an inert atmosphere such that a metal-doped ruthenium oxide material is produced. In some embodiments of the method, the metal-doped ruthenium oxide material is an oxygen evolution catalyst. In various embodiments of the method, including but not limited to embodiments involving oxygen evolution catalysts, both the doping metal and the source of ruthenium are in powder form, and the heating is performed at a temperature below the sintering temperatures of both powders.

The source of ruthenium in embodiments of the method, including but not limited to embodiments involving oxygen evolution catalysts and embodiments where the doping metal and the ruthenium source are in powder form, can be ruthenium oxide. In embodiments that include ruthenium oxide, the heating can be performed such that the doping metal is at least partially oxidized by the ruthenium oxide so as to produce the metal-doped ruthenium oxide material. In embodiments of the method, including but not limited to embodiments involving oxygen evolution catalysts, embodiments where the doping metal and the ruthenium source are in powder form, and embodiments where the doping metal is at least partially oxidized, the doping metal can be Ir or Pb. In embodiments of the method, including but not limited to embodiments involving oxygen evolution catalysts, embodiments where the doping metal and the ruthenium source are in powder form, embodiments where the doping metal is at least partially oxidized, and embodiments where the doping metal is Ir or Pb, the metal-doped ruthenium oxide material can be represented as $MO_xRuO_{(2-x)}$, where M is the doping metal and X is about 0.05, and/or can comprise about 5 to about 25 atomic % of the doping metal.

In another aspect, a metal-doped ruthenium oxide material prepared by any of the methods described in the preceding paragraph is provided. An electrode comprising the metal-doped ruthenium oxide material is also provided, as is a membrane electrode assembly or an electrolysis cell comprising the electrode. Included in various embodiments is an electrolysis cell comprising the membrane electrode assembly.

In a further aspect, another method of making a metal-doped material is provided. The method includes preparing a mixture comprising ruthenium oxide and a doping metal selected from the group consisting of Ir and Pb, and heating the mixture in an inert atmosphere such that an iridium-doped or lead-doped ruthenium oxide oxygen evolution catalyst is produced. In some embodiments of the method, both the doping metal and the ruthenium oxide are in powder form, and the heating is performed at a temperature below the sintering temperatures of both powders. In such embodiments, the iridium can be in the form of iridium black, and the lead can be in the form of lead powder. In embodiments of the method, including but not limited to embodiments where the doping metal is in powder form and embodiments that include iridium black and lead powder, the heating is performed such that the doping metal is at least partially oxidized by the ruthenium oxide so as to produce the oxygen evolution catalyst.

In embodiments of the method, including but not limited to embodiments where the doping metal is in powder form, embodiments including iridium black and lead powder, and embodiments where the doping metal is at least partially oxidized, the ruthenium oxide oxygen evolution catalyst can be represented as $MO_xRuO_{(2-x)}$, wherein M is the doping metal and X is about 0.05, and/or can comprise about 5 to about 25 atomic % of the doping metal.

A ruthenium oxide oxygen evolution catalyst prepared by any of the methods described in the preceding paragraphs is provided. An electrode comprising the ruthenium oxide oxygen evolution catalyst is also provided, as is a membrane electrode assembly or an electrolysis cell comprising the electrode. Included in various embodiments is an electrolysis cell comprising the membrane electrode assembly.

BRIEF DESCRIPTION OF THE DRAWINGS

For a more complete understanding of the present invention, reference is now made to the following descriptions taken in conjunction with the accompanying drawing, in which.

DETAILED DESCRIPTION

A method of making a metal-doped material is provided that includes preparing a mixture comprising a doping metal and a source of ruthenium, and heating the mixture in an inert atmosphere such that a metal-doped ruthenium oxide material. The doping metal can be a metal such as Ir or Pb that provides a metal-doped ruthenium oxide material. In addition, the doping metal can be in various forms such as an oxide or a black. As used herein, the term "black" refers to a solid precipitate or powder of an elemental metal. Any black that can be oxidized is contemplated. Examples of a source of ruthenium include, but are not limited to, such materials as ruthenium black or ruthenium oxide, which in some embodiments can be anhydrous ruthenium oxide. In various embodiments, the inert atmosphere can be produced by an inert gas such as argon or nitrogen.

The doping metal and the source of ruthenium can be in powder form. The powder can be prepared by any method, such as by grinding the doping metal and the ruthenium source. To prepare a metal-doped ruthenium oxide, the powdered doping metal and source of ruthenium can be mixed, then heated in a furnace under flowing argon at a temperature below the sintering temperatures of both powders. Fabricating the metal-doped ruthenium oxide under argon can allow the doping metal powder to preferentially react with oxygen from the ruthenium oxide rather than oxygen from the environment. The mixture is heated until the metal-doped ruthenium oxide is produced. In some embodiments, the mixtures are heated in the range of about 300° C. to about 700° C., more particularly at about 300° C. Heating time will depending on the doping metal, the source of ruthenium, the heating temperature and other conditions. In some embodiments, the heating time is in the range of about 14-18 hours.

The metal-doped ruthenium oxide material, including material performing as oxygen evolution catalysts, can be represented as MO$_x$RuO$_{(2-x)}$, where M is the doping metal and X is about 0.05. Also, the metal-doped ruthenium oxide material, including material performing as oxygen evolution catalysts, can comprise about 5 to about 25 atomic %, more particularly about 5 to about 18 atomic %, and even more particularly about 9 to about 12 atomic % of the doping metal.

In embodiments where the metal-doped ruthenium oxide performs as an oxygen evolution catalyst, the catalyst can be fabricated into an electrode by taking the catalyst and mixing it with binder to form an ink. The catalyst ink is then deposited onto a proton exchange membrane and hot pressed to form the electrode.

Figure 1:
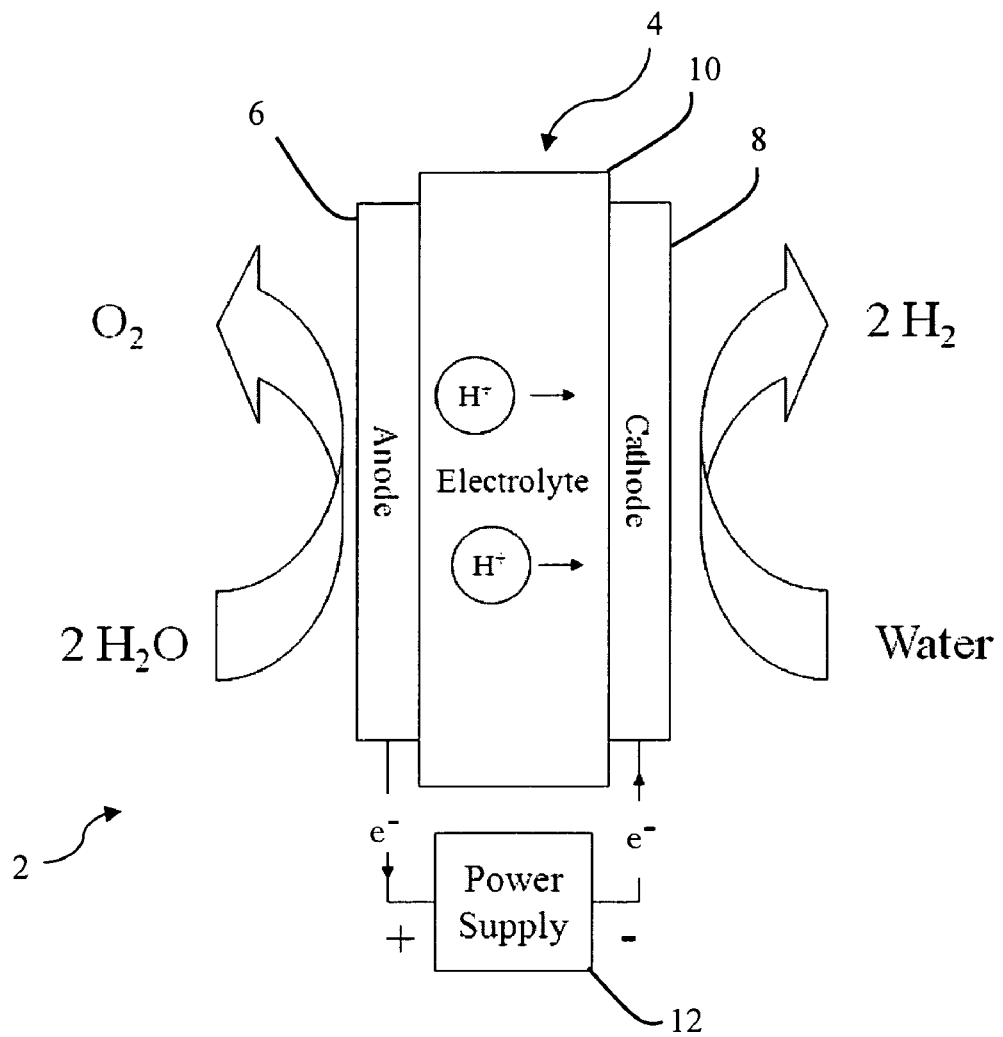
FIG. 1 is a functional schematic of a PEM-based water electrolyzer.

The electrode can be electrochemically evaluated in a three-electrode cell or in a PEM-based membrane-electrode assembly (MEA). For example, referring to FIG. 1, an electrolysis cell 2 can contains a MEA 4 comprising a metal-doped ruthenium oxide anode 6, a platinum cathode 8, and a PEM 10. The electrolysis cell 2 is connected to a power supply or potentialstat 12 and can include a reference electrode (not shown) of mercury-mercury sulfate. In this embodiment, the electrolyte can be 1 N H$_2$SO$_4$.

The catalyst can be subject to various electrochemical performance tests, including current-voltage and constant-current characterization in a PEM electrolysis cell as well as potentiodynamic polarization and electrochemical impedance spectroscopy (EIS) in a three-electrode cell. For example, current-voltage and constant-current characterization of the catalyst can be carried out by fabricating an electrolysis MEA with the given catalyst as described above, and then testing the MEA in an electrolysis test system. In this case, a power supply is used to power the cell. In one case, the power supply steps through increasing current settings. As the current is increased, the cell voltage increases. The test is terminated when a maximum set voltage is reached. In the case of potentiodynamic and EIS studies, an electrode with the given catalyst is fabricated similar to that described above. The electrode (referred to as the working electrode) is then inserted into the three-electrode cell. Potentiodynamic studies are used to characterize the electrode performance in a similar way to the current-voltage characterization of the electrolysis cell. EIS can be used to characterize electrode performance and to determine catalyst stability.

The methods of the present invention provide a stabilized ruthenium oxide oxygen evolution catalyst. Although not wishing to be bound by any hypothesis, the inventors' general approach to the stabilization of ruthenium was guided by the hypothesis that ruthenium in the oxidation state III would be stabilized (prevented from being re-oxidized to state IV) when combined with materials that are both stable and have a strong propensity to stay oxidized, particularly in an acidic environment at oxygen evolution potentials.

The present invention may be better understood by referring to the accompanying examples, which are intended for illustration purposes only and should not in any sense be construed as limiting the scope of the invention as defined in the claims appended hereto.

EXAMPLE 1

Iridium-Doped Ruthenium Oxide

Iridium black and anhydrous ruthenium oxide were chosen as the starting materials. The objective was to dope ruthenium oxide with minimal amounts of iridium; ratios in the range of 5-18 atomic % iridium-doped ruthenium oxides were fabricated. The starting materials were weighed out and mixed by hand using a mortar and pestle. The ground up materials were then heat treated in a furnace at 300° C. for a minimum of 14 hours under flowing argon. The 300° C. temperature was chosen as it is approximately the creep temperature of ruthenium oxide and below the sintering temperature of both materials. The novel oxygen evolution catalyst was fabricated under flowing argon to allow iridium to preferentially react with oxygen from the ruthenium oxide versus oxygen from the environment. The iridium-doped ruthenium oxide catalyst was then fabricated into a PEM-based MEA. The MEA was assembled into a test cell and characterized for electrochemical performance in comparison to a commercially available iridium-ruthenium oxide catalyst.

Figure 2:
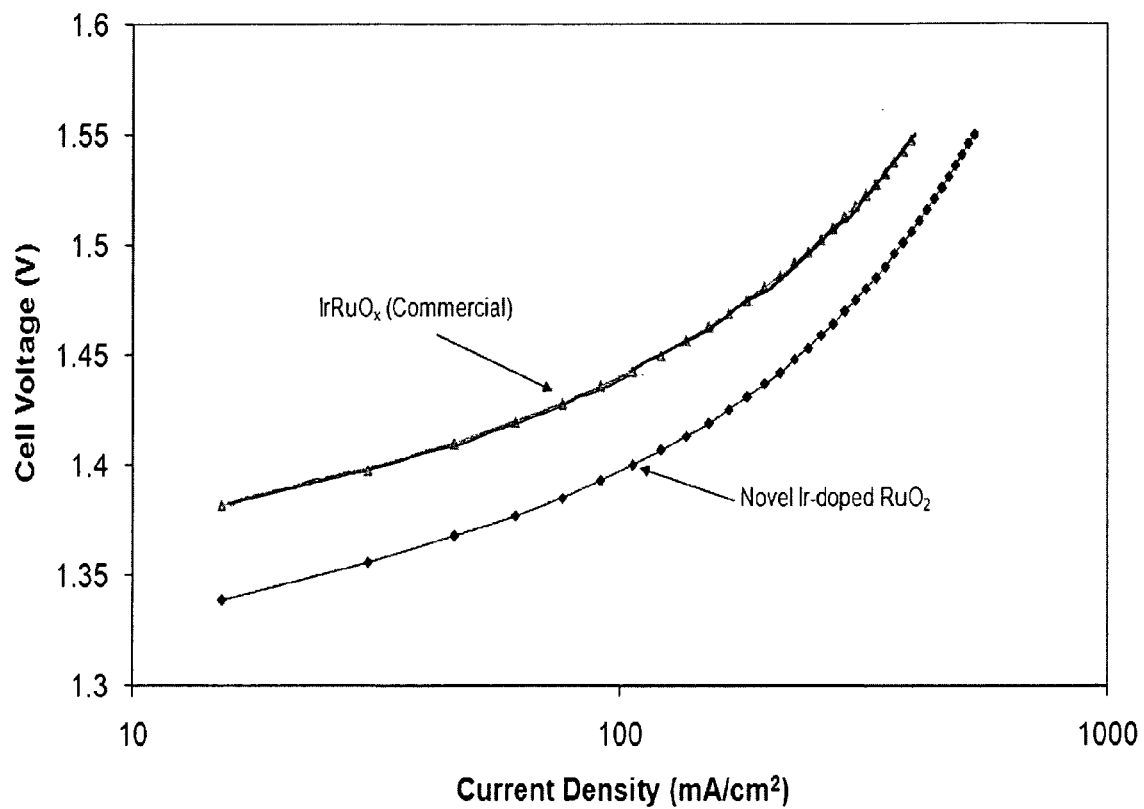
FIG. 2 is current-voltage performance of a PEM-based water electrolyzer MEA fabricated with an Ir-d-RuO$_2$ anode catalyst versus a commercially available MEA with IrRuO$_2$ anode catalyst.

As shown in FIG. 2, the iridium-doped ruthenium oxide catalyst outperformed the commercially available iridium-ruthenium oxide catalyst. In the region of interest, 200-mA/cm$^2$, the iridium-doped ruthenium oxide catalyst can operate at an efficiency of 85%, 2% greater than the commercially available catalyst. An electrolyzer system fabricated from MEA with the iridium-doped ruthenium oxide catalyst can sustain electrolysis at twice the current density and at the same efficiency of commercial catalyst in the range of 100 to 200-mA/cm².

EXAMPLE 2

Lead-Doped Ruthenium Oxide 200 mesh lead powder and anhydrous ruthenium oxide were chosen as the starting materials. The objective was to dope ruthenium oxide with minimal amounts of lead. Two compositions of lead-doped ruthenium oxide were fabricated with 7.5 and 25 atomic percent lead. The starting materials were weighed out and mixed by hand using a mortar and pestle. The ground up materials were then heat treated in a furnace at 300° C. for a minimum of 18 hours under flowing argon. The 300° C. temperature was chosen as it is approximately the creep temperature of ruthenium oxide and below the sintering temperature of both materials. The novel oxygen evolution catalyst was fabricated under flowing argon to allow the lead powder to preferentially react with oxygen from the ruthenium oxide versus oxygen from the environment. The lead-doped ruthenium oxide catalyst was then fabricated into an electrode and electrochemically evaluated in a three-electrode cell.

Figure 3:
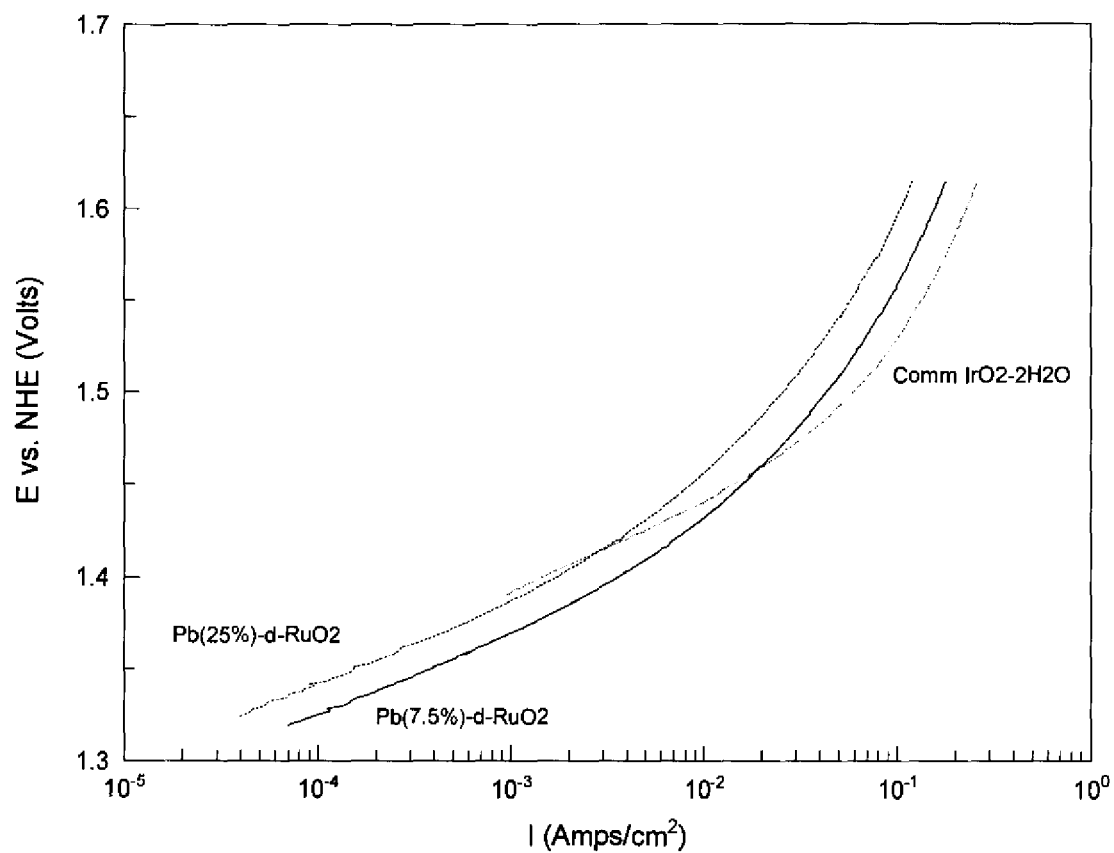
FIG. 3 is a potentiodynamic polarization chart comparing Pb-doped ruthenium oxide catalysts for oxygen evolution.

To characterize the performance of the lead-doped ruthenium oxide catalyst three different electrodes were prepared. Electrodes were fabricated from the 7.5 and 25 mole % lead-doped ruthenium oxide and a standard of commercially available hydrous iridium oxide. As shown in the FIG. 3, the lead-doped ruthenium oxide catalyst can outperform commercially available hydrous iridium oxide at current densities lower than 18-mA/cm². This performance is comparable to the highest performing oxygen evolution catalyst.

REFERENCES

The following publications are incorporated by reference herein:

1. P. Millet, M. Pineri, and R. Durand, *J. of App. Electrochem,* 19, 162-166, (1989).

2. P. Millet, F. Andolfatto and R. Durand, *Int. J. of Hydrogen Energy,* 2, 2, 87-93 (1996).

3. E. Rasten, G. Hagen, and R. Tunold, *Electrochimica Acta,* 48, 3945-3952 (2003).

4. S. Trassati, *Electrochimica Acta,* 29, 1503-1512 (1984).

5. T. I. Valdez, J. Sakamoto, K. Billings, S. A. Firdosy, F. Mansfeld, and S. R. Narayanan, *Presented at the 213th Meeting of the Electrochemical Society,* Abs #360 (2008).

6. E. N. Balko and C. R. Davidson, *J. Inorg. Nucl. Chem.,* 42, 1778-178 (1980).

7. R. S. Yeo, J. Orehotsky, W. Visscher, and S. Srinivasan, *J. Electrochem. Soc.: Elect. Sci. and Tech.,* 9, 1900-1904 (1981).

8. S. Trasati, *Electrochemica Acta,* 29, 2, 1503-1512 (1984).

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A method of making a metal-doped material, comprising:
   a) preparing a mixture comprising a doping metal and a source of ruthenium; and
   b) heating the mixture in an inert atmosphere such that a metal-doped ruthenium oxide material is produced;
   wherein the preparing comprises mixing the doping metal and the source of ruthenium, the doping metal being in the form of a powder of an elemental metal and the source of ruthenium being in powder form.

2. The method of claim 1, wherein the metal-doped ruthenium oxide material is an oxygen evolution catalyst.

3. The method of claim 1, wherein both the doping metal and the source of ruthenium are in powder form, and the heating is performed at a temperature below the sintering temperatures of both powders.

4. The method of claim 1, wherein the source of ruthenium is ruthenium oxide.

5. The method of claim 4, wherein the heating is performed such that the doping metal is at least partially oxidized by the ruthenium oxide so as to produce the metal-doped ruthenium oxide material.

6. The method of claim 1, wherein the doping metal is Ir or Pb.

7. The method of claim 1, wherein the metal-doped ruthenium oxide material is represented as $MO_xRuO_{(2-x)}$, wherein M is the doping metal and X is about 0.05.

8. The method of claim 1, wherein the metal-doped ruthenium oxide material comprises about 5 to about 25 atomic % of the doping metal.

9. A metal-doped ruthenium oxide material prepared by the method of claim 1.

10. An electrode comprising the metal-doped ruthenium oxide material of claim 9.

11. A membrane electrode assembly or an electrolysis cell comprising the electrode of claim 10.

12. A method of making a metal-doped material, comprising:
   a) preparing a mixture comprising ruthenium oxide and a doping metal selected from the group consisting of Ir and Pb; and
   b) heating the mixture in an inert atmosphere such that an iridium-doped or lead-doped ruthenium oxide oxygen evolution catalyst is produced;
   wherein the preparing comprises mixing the ruthenium oxide and the doping metal, the ruthenium oxide being in powder form and the doping metal being in the form of a powder of elemental Ir or Pb.

13. The method of claim 12, wherein both the doping metal and the ruthenium oxide are in powder form, and the heating is performed at a temperature below the sintering temperatures of both powders.

14. The method of claim 13, wherein the iridium is in the form of iridium black, and the lead is in the form of lead powder.

15. The method of claim 12, wherein the heating is performed such that the doping metal is at least partially oxidized by the ruthenium oxide so as to produce the oxygen evolution catalyst.

16. The method of claim 12, wherein the ruthenium oxide oxygen evolution catalyst is represented as $MO_xRuO_{(2-x)}$, wherein M is the doping metal and X is about 0.05.

17. The method of claim 12, wherein the ruthenium oxide oxygen evolution catalyst comprises about 5-25 atomic % of the doping metal.

18. A ruthenium oxide oxygen evolution catalyst prepared by the method of claim 12.

19. An electrode comprising the ruthenium oxide oxygen evolution catalyst of claim 18.

20. A membrane electrode assembly or an electrolysis cell comprising the electrode of claim 19.

* * * * *